Figure 1:
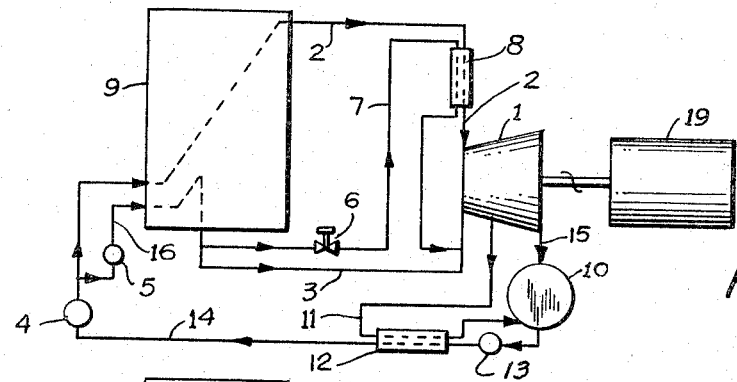

INVENTOR:
ERNEST LAGELBAUER

United States Patent Office 3,312,056
Patented Apr. 4, 1967

3,312,056
SUPER TEMPERATURE DUAL FLOW
TURBINE SYSTEM
Ernest Lagelbauer, 410 E. 13th St.,
New York, N.Y. 10009
Filed Mar. 9, 1964, Ser. No. 350,292
1 Claim. (Cl. 60—39.18)

This invention concerns turbine powerplant cycles for highly efficient conversion of heat into mechanical energy, which are based on the "super temperature dual" (STD) flow principle, and which are particularly suited for rational utilization of heat available at exceedingly high temperatures.

The present invention is related to and represents improvements over the disclosure of U.S. Patent No. 2,626,502 of Jan. 27, 1953, by E. Lagelbauer.

In essence, this dual flow turbine principle is based on the artifice of substantially reducing the thermodynamic loss involved in mixing flow components of widely different temperature, a process characterized by irreversible increase of entropy. For this purpose, instead of diluting the working substance with a cool substance (for instance, diluting the stoichiometric combustion gases of a gas-turbine with adequate excess air within the combustor), in the case of STD cycles the diluting flow component is first passed through the same turbine through which the high-temperature primary flow passes (occupying a different partial area of the blading disc) before being allowed to intermix with the latter. As the two flow components expand in the turbine nozzle stage, the temperature of each drops in relation to its respective temperature and consequently, also the attending temperature difference is greatly reduced. (Another factor contributing to the reduction of the temperature difference is the indirect heat-exchange taking place via the surface of the rotary blading.) Since the heat transfer due to the mixing of components of different temperature is responsible for by far the largest portion of the entropy rise characterizing the turbine losses (and rather minimally in consequence of attending velocity differences), the major loss factor is thus in effect substantially reduced and the powerplant efficiency correspondingly enhanced.

In general, the two flow components pass through different partial sectors of the turbine blading, yet in the case of the utilization of heat available at moderately high temperature, the passing of the secondary (cool) flow component through the inner partial annulus of the blading comes into consideration and the secondary flow effects the cooling of the blades by heat abstraction from the root, the critical region of the blades, whereas in the case of partial sector area division the blades pass alternately through the hot primary and the cool secondary flow so that a thin surface layer is subjected to temperature oscillation of relatively high frequency, while the blade interior assumes a steady temperature compatible with material strength, which roughly corresponds to the temperature of mixing the two flow components. In this connection, mention is made of the possibility of enhancing the endurance of the blades by the application of a very thin coating of suitable material, metallic (for instance tungsten) or ceramic.

A secondary important, though optional feature of the STD turbine system, relates to the provision of optimal stream conditions in the entering of the two flow components into the rotating turbine blading and to the avoidance of strongly fluctuating impact pressure on the blades. These objectives are achieved by adequately raising the initial pressure of the secondary (relatively cool) flow component above that of the primary (high-temperature) flow, so that the provided pressure differential compensates for the temperature deficiency of the secondary flow with the result of essentially identical velocity acquired by the two flow components in expanding through the turbine nozzle stage to the same back-pressure. Consequently, the expansion nozzles for each flow component can have the same inclination toward the plane of the blading disc, thus providing clean uninterrupted flow conditions and avoiding the detriment of strongly varying dynamic pressure on the blades.

FIGURES 1 to 4 illustrate examples of application of the STD principle: FIGURE 1 illustrates a STD turbine cycle utilizing heat furnished at high temperature by a nuclear reactor, and employing a condensing working medium, for instance, water. (For simplicity of illustration, direct circulation of the working substance through the reactor is assumed.) Only the principal features are shown, inasmuch as cycle refinements for further enhancing the inherent thermal efficiency are analogous to those used for conventional modern steam powerplant practice. It should be emphasized that by virtue of application of the STD feature the reactor may be operated at an unconventionally high temperature (the limitation is set solely with respect to aspects of reactor design and operation) and consequently, in addition to the inherent superiority of STD turbine cycles as above outlined, such a system has the advantage of a basically high thermal efficiency. Pressure booster pump 5 operating in series with the reactor feed pump 4 effects the requisite pressure differential in accordance with above indications and therefore two different pressure branches in the reactor are required. The temperature of the secondary flow into the turbine may be adjusted by means of a control valve 6 in a by-pass line 7, heat-exchanging with the primary turbine flow in a heat exchanger 8.

Figure 2:
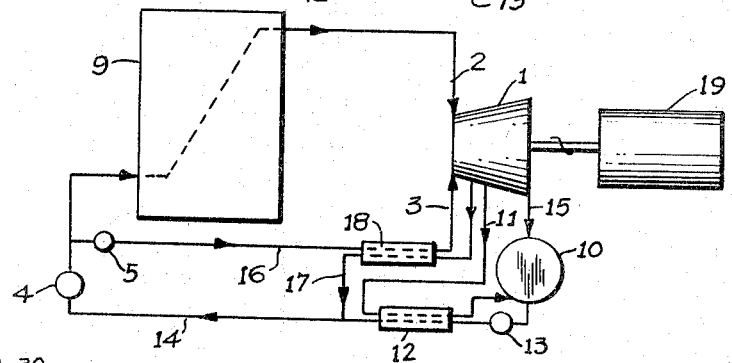

FIGURE 2 shows a variation of the cycle, FIGURE 1. In this version, the fraction of the condensate forming the secondary flow is heated to, or nearly to, the required temperature by heat exchange with turbine extraction steam 11 in a heat exchanger 18; the temperature of the secondary turbine flow may be regulated by control of the extraction steam flow rate, while the flow rate of the secondary turbine steam 3 is controlled by the pumping rate of the pump or pressure booster 4.

Figure 3:
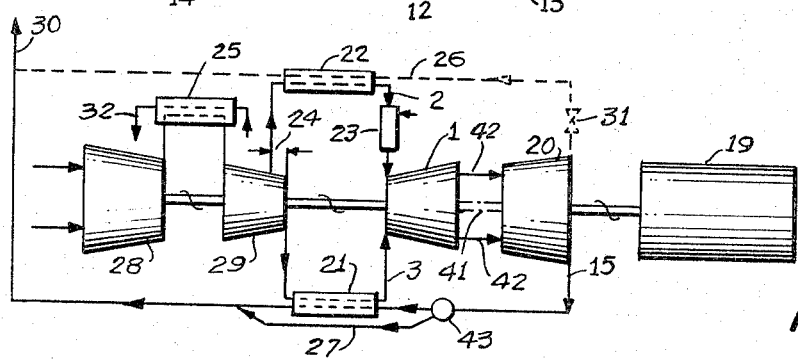

FIGURE 3 shows the adaptation of the STD concept for a fuel-burning regenerative gas-turbine plant. In contradistinction to the conventional mode of applying regeneration to an ordinary gas-turbine cycle by establishing heat exchange between the turbine exhaust and the compressed air before being heated by combustion of fuel, in the case of the STD cycle the regenerative heat exchange is preferably applied between the plant exhaust and the secondary airflow before its admission into the STD turbine, as shown. Depending upon the particular design conditions, it may be warranted to regeneratively preheat the combustion air also, in the conventional manner in order to achieve maximal thermal efficiency under the prevailing conditions, for instance, in the case of a plant burning fuel of very low heat value. The diagram of FIGURE 3 shows air compression with stage intercooling and the required secondary turbine-flow pressure boost is in this case accomplished by means of a suitable number of additional (axial-flow) pressure stages (24) of the high-pressure compressor 29 (although a separate booster compressor with interposed air cooling might be employed). The employment of a secondary normal type gas-turbine 20, is optional.

Figure 4:
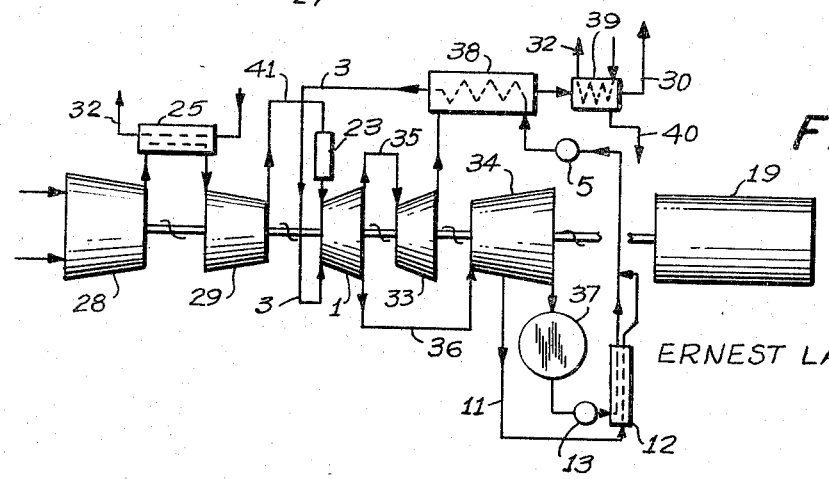

FIGURE 4 illustrates the adoption of the STD concept for a gas/steam combination powerplant cycle, the outstanding advantages of which are, the feasibility of high recovery of heat from the exhaust of the gas-turbine plant section, and the augmentation of the pressure potential due to air compression, into the region of sub-atmospheric pressures by virtue of the attending condensation of the steam turbine flow. The extraordinary high thermal efficiency of such a cycle is in essence a consequence of heat intake into the cycle at exceedingly high temperature and heat rejection at a temperature of the order of the available heat sink (circulating water). In order to minimize the intermixture of gases and steam, the STD turbine 1 (which only is traversed by both, gases and steam) has only one (respectively a small number of) rotor blading stage. The recovery of water from the plant exhaust by means of condenser 39 is optional, and warranted only under particular circumstances.

List of designations:

1—STD turbine
2—primary turbine flow component (high-temperature)
3—secondary turbine flow component
4—feed pump (reactor or steam-generator)
5—pressure booster pump
6—flow control valve
7—by-pass for control of temperature of secondary flow component
8—heat-exchanger
9—nuclear reactor
10—condenser
11—turbine extraction steam to feed water heater
12—feed water heater
13—condensate pump
14—condensate line
15—turbine exhaust
16—fraction of condensate flow forming secondary turbine flow
17—turbine extraction steam to secondary turbine-flow heater 18
18—secondary turbine-flow heater
19—load, electric generator for instance
20—secondary gas-turbine of conventional design
21—regenerator
22—supplementary regenerator for pre-heating combustion air, optical
23—combustor(s)
24—compressor section for producing pressure differential
25—compressor inter-stage cooler
26—turbine plant exhaust branch to supplementary regenerator 22
27—regenerator by-pass
28—low-pressure compressor
29—high-pressure compressor
30—gas-turbine plant discharge
31—supplementary regeneration control valve
32—circulating (cooling) water
33—gas-turbine
34—steam-turbine
35—gas pass
36—steam pass
37—condenser
38—steam generator
39—moisture interceptor (condenser)
40—drip intercepted by 39
41—optional shaft connection
42—gas passes from STD turbine 1 to normal turbine 20
43—diverter valve controlloing flow in by-pass 27

These features embodying the essential of my invention as herein described and illustrated by figures admit of many variations and modification in particular designs for practical application thereof and it should be understood therefore, that the description and inherent information presented is to set forth the basic principles and should not limit the scope thereof.

I claim:

Apparatus comprising a turbine having blading arranged in first and second sectors each supplied by a nozzle stage, means for introducing a primary working fluid at relatively high temperature to the first sector nozzle stage, a source of secondary working fluid at a lower temperature than said primary fluid, means for elevating the pressure of said secondary fluid to a value exceeding that of said primary fluid, and means for introducing said secondary fluid at its elevated pressure to the second sector nozzle stage, said nozzle stages delivering the respective fluids into the turbine blading to produce substantially equal flow velocities through the rotating turbine blade passages for both fluids, said apparatus including passages connected in parallel relationship between the source of secondary fluid and its nozzle, one of said lines containing a valve and the other an exchanger for transferring heat from said primary fluid to a portion of said secondary fluid.

References Cited by the Examiner

UNITED STATES PATENTS

| | | | |
|---|---|---|---|
| 2,536,062 | 1/1951 | Kane | 60—59 |
| 2,626,502 | 1/1953 | Lagelbauer. | |
| 3,029,197 | 4/1962 | Untermyer | 60—43 |

MARK NEWMAN, *Primary Examiner.*

RALPH D. BLAKESLEE, *Examiner.*